C. R. L. FUGLSANG.
POTATO PLANTING MACHINE.
APPLICATION FILED MAR. 4, 1915.

1,209,138.

Patented Dec. 19, 1916.

Witnesses:

Inventor:
Christen Rotbøll Larsen Fuglsang

UNITED STATES PATENT OFFICE.

CHRISTEN ROTBÖLL LARSEN FÜGLSANG, OF TOUSIG, NEAR OESTERILD, DENMARK.

POTATO-PLANTING MACHINE.

1,209,138.  Specification of Letters Patent.  Patented Dec. 19, 1916.

Application filed March 4, 1915. Serial No. 12,094.

*To all whom it may concern:*

Be it known that I, CHRISTEN ROTBÖLL LARSEN FÜGLSANG, a subject of the King of Denmark, residing at Tousig, near Oesterild, in the Kingdom of Denmark, have invented a new and useful Potato-Planting Machine, of which the following is a specification.

My invention relates to a potato-planting machine, that plants the potatoes with equal intervals.

Figure 1:
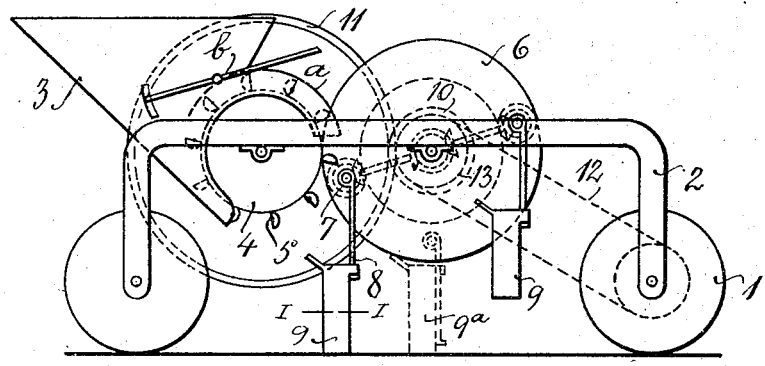
Figure 2:
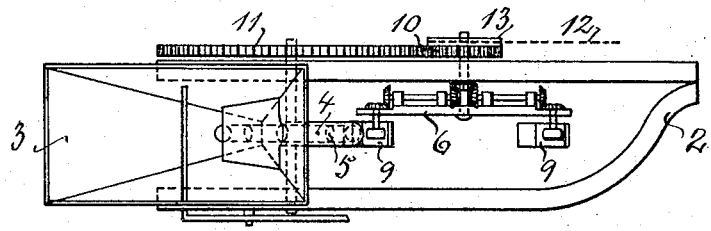

In the accompanying drawing Figure 1 is a side-view of the potato-planting machine; Fig. 2 a top view of the same, with the driving wheels omitted; and Fig. 3 a section of a detail along the line I—I in Fig. 1.

Figure 3:

On a frame 2 furnished with driving-wheels 1, Fig. 1, there is disposed a hopper 3 the bottom of which consists of a roller or wheel 4 having a turnable axle with bearings in the frame 2. The roller 4 has cup-shaped recesses 5 on its periphery, each recess being just large enough to hold one potato. In the hopper there is disposed a screen $a$ which only permits one potato at a time to fall down into the cup-shaped recesses 5 and a lever $b$ by means of which the potatoes can be loosened if they get pressed together too hard. In the frame 2 there is furthermore disposed a turnable flat wheel 6 which is furnished with stationary pins 7 on which rods 8 are turnably attached. The rods 8, which end in small stop-knobs, slide in eyes in tubes 9, the sectional shape of which is shown in Fig. 3. The drawing only shows two such tubes 9, but several may be used. The tubes may be held in a vertical position by means of a system of conical wheels on axles mounted on the flat wheel 6, Fig. 2. The wheels 4 and 6 turn in opposite directions while the machine is being driven along, and are given their motion for instance by means of a cog-gear 10, 11, which by means of a chain-and-sprocket gear 12, 13 is driven from one of the driving-wheels.

The potatoes to be planted are filled into the hopper 3, and the machine is set in motion. A potato which falls from the hopper into the cup-shaped recess 5 falls out of the recess again as soon as it has cleared the lower edge of the hopper. At this very moment one of the tubes 9 is in position just under the recess 5 and thus the potato falls into the tube. Now as the wheel 6 continues to turn around, this tube takes the position $9^a$ indicated by dotted lines in Fig. 1, and just as this position is reached, but not till then, the corresponding rod 8 is lifted, and after it the tube is lifted, from the ground. Thus a potato is planted every time a tube 9 touches the ground, and this takes place every time the wheel 6 makes half a revolution. Thus the intervals between the planted potatoes will be uniform.

The machine may also be disposed on or attached to an ordinary plow which at the same time plows a furrow in which the potatoes are planted and covers up said furrow as fast as the potatoes are planted in it. One or more of the driving wheels may, in this case, be omitted. In such a machine the soil turned up by the plow is thrown back over the planted potatoes while they are still in the tubes, which are not drawn up till the potatoes are covered.

I am aware that prior to my invention potato planting machines have been made having rotary feed wheels delivering into planting tubes mounted upon a rotating carrier. I therefore do not claim such a combination broadly, but

I claim:

In a potato planting machine, the combination of a frame having driving wheels, a hopper disposed on said frame, a feed wheel forming bottom of said hopper and having recesses adapted to hold one potato, a screen permitting only one potato at a time to fall into said recesses, a flat wheel disposed in said frame and having pins, rods being suitably attached to said pins, planting tubes sliding on said rods, into which tubes the said recesses are adapted to deliver, means for holding the said planting tubes in a vertical position, and means for turning the said feed wheel and the said flat wheel in opposite directions, substantially as shown and described.

In witness whereof I have hereunto set my hand in the presence of two witnesses.

CHRISTEN ROTBÖLL LARSEN FÜGLSANG.

Witnesses:
BERNH. LARSEN,
GEORG V. NELSEN.

Copies of this patent may be obtained for five cents each, by addressing the "Commissioner of Patents, Washington, D. C."